July 1, 1958 R. STUART-WILLIAMS ET AL 2,841,763

TESTING SYSTEM FOR MAGNETIC MATERIALS

Filed June 30, 1953 2 Sheets-Sheet 1

INVENTORS
RAYMOND STUART-WILLIAMS
WITOLD M. MODLINSKI &
ARTHUR W. LO

BY Samuel Lindenberg
ATTORNEY

TESTING SYSTEM FOR MAGNETIC MATERIALS

Filed June 30, 1953

2 Sheets-Sheet 2

INVENTORS
RAYMOND STUART-WILLIAMS
WITOLD M. MODLINSKI &
ARTHUR W. LO

BY Samuel Lindenberg
ATTORNEY

United States Patent Office 2,841,763

Patented July 1, 1958

2,841,763

TESTING SYSTEM FOR MAGNETIC MATERIALS

Raymond Stuart-Williams, Pacific Palisades, Calif., and Witold M. Modlinski, Trenton, and Arthur W. Lo, Haddonfield, N. J., assignors to Radio Corporation of America, a corporation of Delaware Application June 30, 1953, Serial No. 365,186

10 Claims. (Cl. 324—40)

Figure 1:
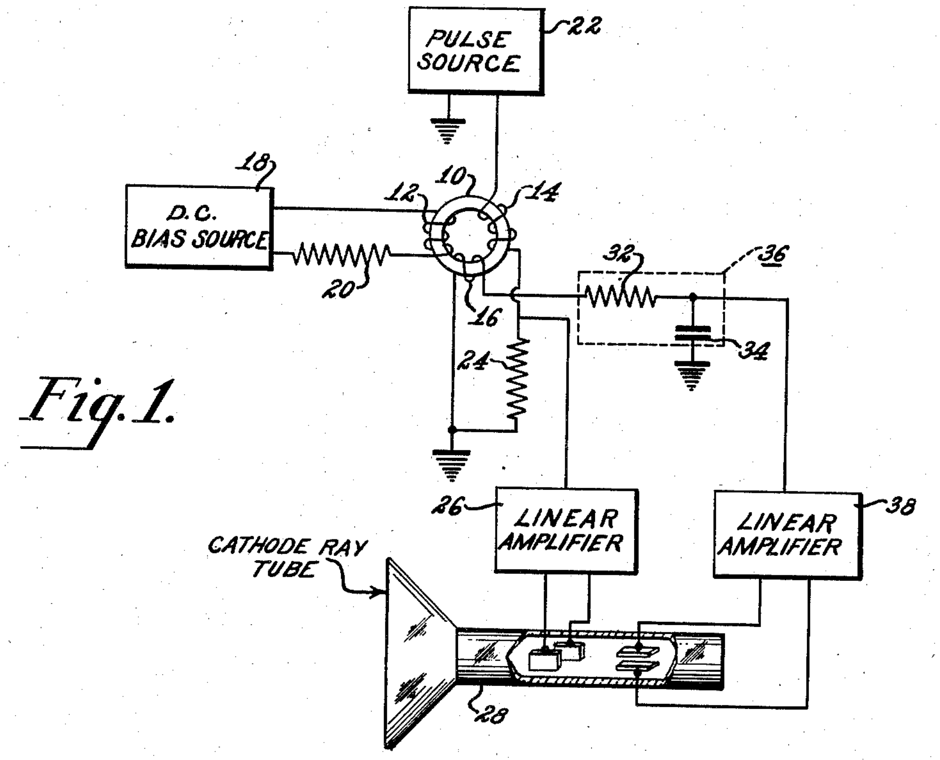

This invention relates to a method and apparatus for testing magnetic materials and more specifically to an improvement in the method and apparatus used to obtain the hysteresis characteristics of magnetic materials.

In the field of computing and information handling, considerable work has been done toward the obtention of a high speed memory. This consists of, at present, a system wherein a large number of very small magnetic cores are used which store information in the form of saturation in the positive or negative regions of their characteristic which correspond to the one or zero of the binary system. Magnetic switches used as logical elements are also assuming importance in this field. Memories and switches may be found described in an article by Jan A. Rajchman, entitled "Static magnetic matrix memory and switching circuits," in the RCA Review, June 1952, and also more recently in the magazine Electronics, April 1953, entitled "Ferrites speed digital computers," by David R. Brown and Ernst Albers-Schoenberg, pages 146–149.

The testing of these magnetic cores has always been a complex and difficult process. It is essential that for the purpose of efficient and accurate operation the cores be selected with the most uniform and best possible hysteresis characteristics required for the particular application. In order to test these cores, analogy methods have been evolved which provide sufficient data for design and evaluation processes. One of these methods consists of driving a core to saturation at one polarity, then, driving the core towards the opposite polarity with a number of pulses of less than a critical value, and then finally driving back to saturation at the one polarity with a pulse of higher than critical value, to see whether the core has sufficient "memory" ability.

It has been found, however, that for certain applications involving the use of these cores for switching purposes, these methods are not adequate, and therefore it is required to plot the complete characteristics of the cores. Unfortunately, when testing very small cores it has been found that the properties of the cores are, to a certain extent, a function of the geometry and size of the core under test. This is especially true in the case of ferrospinels where the size and shape affect the cooling cycle, and hence the magnetic properties. Further, it is necessary to test large numbers of these cores, since for most computing and switching applications only perfection is permissible, thus making it necessary to test every core which is to be used. There is, therefore, a need for some means which will enable the plotting of the characteristics of very small magnetic cores rapidly and accurately.

The usual manner of describing a magnetic material is to plot the two quantities B and H against each other, producing what is known as a hysteresis loop. B is a measure of flux density produced as a result of applying a magnetomotive force H. B multiplied by the cross section area of the core under test is $\phi$, the total flux. H multiplied by the path length of the flux is proportional to the number of turns linking the core (T) multiplied by the current flowing through those turns (I). Thus B and H are parameters which are independent of the geometry of the core. If a suitable toroidal core is employed and the number of turns is known, then in the first case it is only necessary to plot $\phi$ and I to be able to obtain the B—H characteristic. In many practical applications, in fact, the $\phi$—I loop is all that is required.

Consider a winding which is coupled to a core being driven around its hysteresis characteristic. The voltage that is induced in this winding, *e*, is proportional to $$T_1\frac{d\phi}{dt}$$

where $T_1$ is the number of turns in the winding and $$\frac{d\phi}{dt}$$

is the rate of change of flux in the sample. Hence $\phi$ is proportional to $\int edt$. Thus, if a current change *i* occurs in the driving winding, it is only necessary to determine $\int edt$ to determine the flux change caused by the current change *i*. This has led to the classical method of obtaining the B—H characteristics which consists of applying a voltage which can be varied through some current measuring means across a large number of turns linking a core under test. A separate winding is used to detect the change of flux occasioned by varying the amount of the voltage being applied through the first coil. The voltage induced in the separate winding is integrated. Using some visual indicator such as an oscilloscope the current applied to change the flux through the core vs. the output of the integrating device may be displayed. The driving voltage is varied from zero to a value which saturates the core at one polarity. The driving voltage is then reduced to zero, reversed, increased to saturate the core in the negative polarity, and then is brought back to zero again. Of course, this system has been mechanized to operate fairly rapidly.

The magnetic toroidal cores which are used in a magnetic memory or switch have a cross-sectional area on the order of .015×.015 or about 0.0015 square cm., where the material is ferrospinel. The total B change in this material is only about 3000 lines per square cm. This represents a root mean square flux change of only 16 flux lines in the toroidal core. Accordingly, the voltage induced in a one turn winding on a core of this material has an amplitude of about one microvolt per turn per cycle per second. The use of more than one turn in such small cores to achieve voltages which can be amplified and integrated accurately is extremely difficult. To obtain an appreciable voltage it is necessary to use frequencies of 10,000 cycles or higher. Unfortunately, this produces two other effects which make it undesirable to test at such high frequencies. First, the losses in the material become very high, causing excessive heating, and second, eddy current losses become high. The latter losses are due to the magnetic material being a conductor. In ferrospinels, very little eddy current flows, but at high frequencies other effects are present which are quite similar. Thus, it is extremely difficult to test accurately magnetic cores which have a small amount of material.

It is an object of the present invention to provide a new and simple system for obtaining the hysteresis characteristic of small magnetic cores.

It is another object of the present invention to provide an improved system for obtaining induced voltage outputs from small magnetic cores.

A further object of the present invention is to provide an improved system and method for testing small amounts of magnetic material which do not require a large number of coupling turns for a pickup coil.

These and further advantages of the present invention are achieved by applying to the magnetic material under test a magnetic bias which sets the magnetic material in one of its two magnetic saturation regions. There is then applied a magnetomotive driving force in the form of successive pulses having an increasing amplitude and driving the material toward saturation in its other magnetic saturated region. The magnetic bias returns the core to saturation at its first region between the driving pulses. Thus a substantially greater change in flux occurs with each driving pulse, since they all start from the same point on the characteristic curve instead of continuing from the point to which the magnetic material was last driven. To obtain the negative or other side of the characteristic curve the bias is reversed and the direction of the driving pulses is also reversed.

Figure 2:
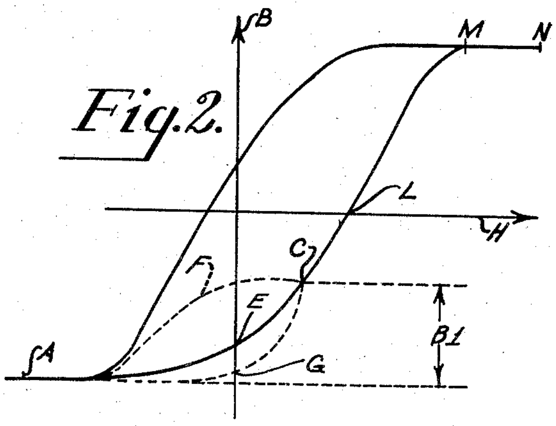
Figure 3:
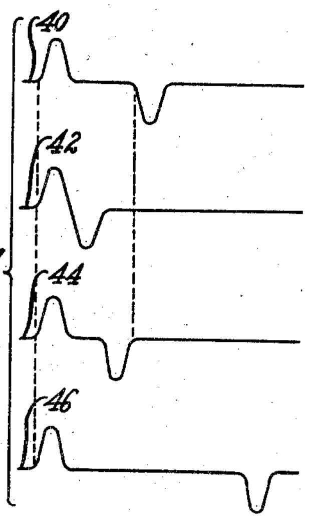
Figure 4:
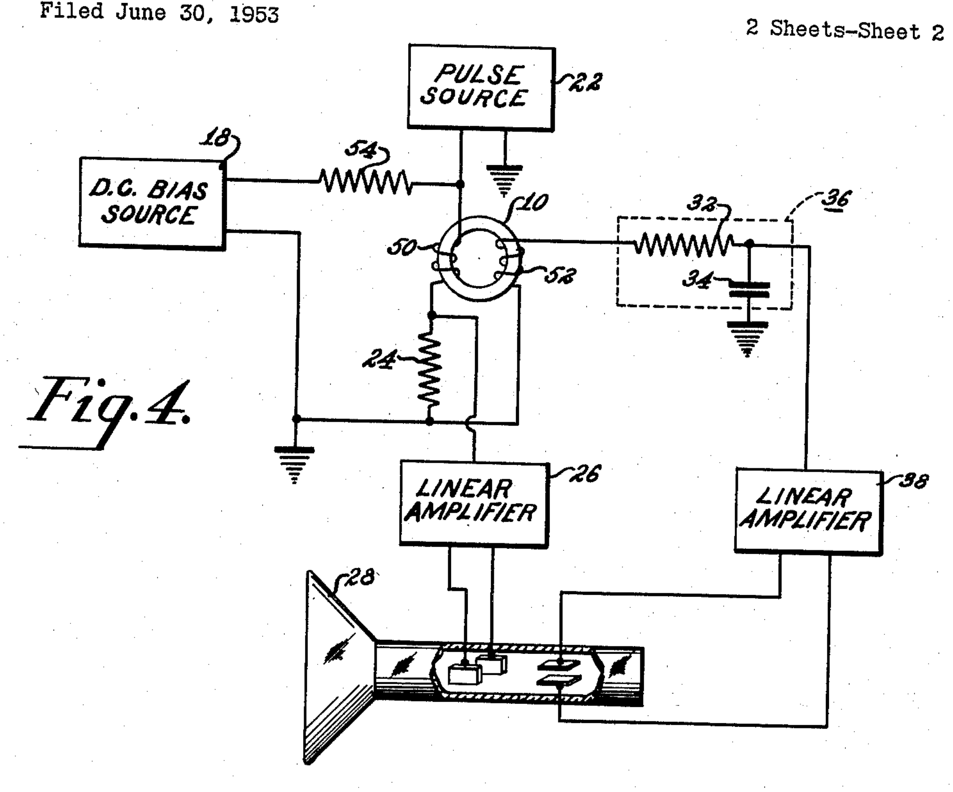
Figure 5:
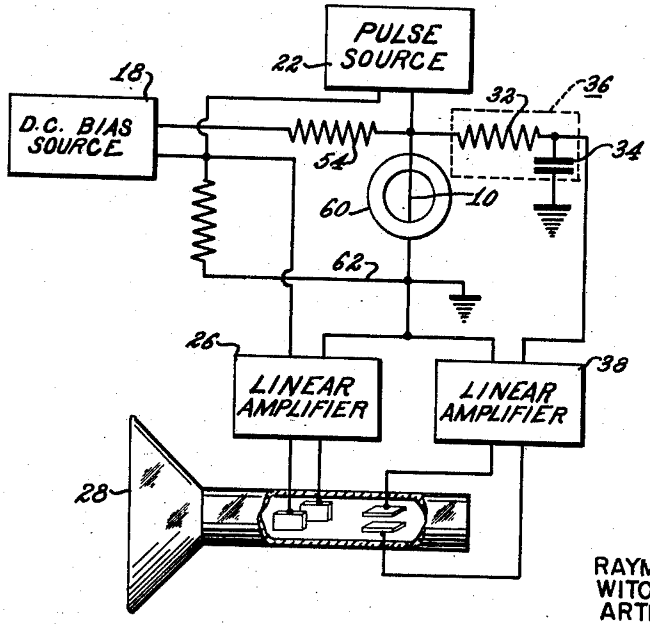

The novel features of the invention as well as the invention itself, both as to its organization and method of operation, will best be understood from the following description, when read in connection with the accompanying drawings, in which Figure 1 is a schematic drawing of one embodiment of the invention, Figure 2 is a curve of the hysteresis characteristic of magnetic material shown for the purpose of assisting in the explanation of the invention, Figure 3 is a curve of wave shapes shown for the purpose of assisting in the explanation of the adjustment of the apparatus used in practicing this invention, and Figures 4 and 5 are schematic diagrams of other embodiments of the invention.

Reference is now made to Fig. 1, showing the schematic of the invention. A small magnetic toroidal core 10 of the type intended has three coils 12, 14, 16 coupled thereto. The first coil 12 is connected to a source of direct current 18, through a limiting resistor 20. The current obtained from this bias source 18 has an amplitude sufficient to bias the core 10 under test to a saturated region of its characteristic curve, for example, position A on the hysteresis curve shown in Figure 2. A pulse source 22 for a series of pulses having a successively increasing amplitude is shown connected to a second coil 14. In series with this coil is also a measuring resistor 24. The voltage across this resistor 24 is applied through a linear amplifier 26 to the horizontal deflectors of the cathode ray tube 28 of an oscilloscope. The pulses from the source are applied to the second coil 14 in a direction to provide a magnetomotive force to oppose the magnetomotive force derived from the first coil 12, so that, a pulse applied to the second coil drives the toroidal core 10 toward saturation at the opposite polarity . Upon the expiration of a pulse the core is returned to position A by operation of the direct current bias. The next pulse having a larger amplitude drives the core further toward saturation at the opposite polarity, and when it subsides the core is again returned to position A. The rate of change of the flux in the core is measured by means of the third coil 16 which is connected to a series resistor 32 and parallel condenser 34 which serve as an integrating network 36. The output of the integrating network 36 is connected to a linear amplifier 38. The output of the linear amplifier is applied across the vertical deflectors of the cathode ray oscilloscope tube.

As previously shown, the flux change in the cores is measured by the integral with respect to time of the voltage induced in the third coil 16. Accordingly, the cathode ray tube beam will be deflected vertically to a height in accordance with the flux change of the core. The cathode ray oscilloscope, of which the cathode ray tube 28 is a part, is not shown, since it is well known in the art and a showing thereof would needlessly complicate the drawings. The magnetomotive force applied to the core may be represented by the current pulse amplitude applied from the pulse source. This is measured, as previously indicated, by means of the voltage developed across the measuring resistor 24. This voltage is applied through the amplifier 26 to the horizontal deflecting plates of the cathode ray tube 28. More effective integrating schemes may be used for greater accuracy and may be found described in pages 662 and 664 of the book by Chance et al., called Waveforms, and published by McGraw-Hill Book Company.

The pulse current applied to the core multiplied by the number of turns in the second coil 14, minus the direct current applied to the core multiplied by the number of turns in the first coil 12, is a measure of the resulant magnetomotive force being applied to the core. Since the number of turns of the first and second coils and the direct current being applied are all known and are constant factors, the pulse current in the second coil can be taken as a measure of the change in the magnetomotive force in the core. Hence, the cathode ray tube beam is deflected horizontally by an amount proportional to the change of H. The output from the integrator is proportional to the change of flux. Since the geometry of the core is known, the vertical deflection of the cathode ray tube beam can be taken as representative of the change in B.

Before testing any cores, the wave form from the pulser should be properly established in a manner and for reasons which will be made more clear by reference to Fig. 3. The pulse wave form should be viewed by a cathode ray oscilloscope having its horizontal terminals applied across the third output coil. The wave form seen should resemble the wave form 40 shown in Fig. 3. If it resembles the wave forms 42 and 44, the length of the input pulse should be increased until the wave form 40 is achieved. If, on the other hand, wave form 46 is obtained, the input should be decreased in length. This adjustment insures that the input pulse is long enough to allow the flux in the core to settle to its stable state, and yet is not so long that the accuracy of the integrator network is impaired.

Figure 2 shows a typical hysteresis loop having a B and H axis. Point A represents the point to which the core is magnetized by the direct current in the first winding. Point C represents a point to which the core is magnetized by applying a pulse to winding 2. If the core has no eddy current or similar effects, the magnetic path described by the core is defined by AECEA. If, however, eddy currents or similar effects are present and provided the input pulse is long enough to allow the magnetization to settle, some path such as AGCFA will be followed. In all cases, however, point C will be reached eventually, causing a change of flux B1. Point C is on the D. C. characteristic of the core and is free from errors produced by eddy currents. As the amplitude of the current pulses in winding 2 increase from zero to a maximum, a magnetic excursion of the core along curve AECLMN is followed, which is the B—H characteristic. Since the cathode ray beam is deflected in a manner to follow this, the same curve is traced on the cathode ray screen.

Once this curve is obtained, calibration of the currents and turns may be employed to fix point C. This fixes the B axis. Point N is fixed such that points A and N are equidistant from the B axis. They are also equidistant from the H axis which enables fixing of this axis. This statement is true only if sufficient current has been applied to insure that points A and N lie on the saturated part of the characteristic. The other half of the hysteresis loop is symmetrical and may be drawn in, or alternatively, the currents in windings 1 and 2 may be reversed in polarity to trace this curve.

This scheme has the advantage that quite large signals are obtained from winding 3 (0.1 to 1 volt) even with the smallest cores. In addition, the curve obtained is the steady state or D. C. hysteresis loop. Hence, a method and apparatus has been provided which produces the D. C. characteristic of small cores without suffering the disadvantage of having to amplify very small signals.

The system shown in Figure 1 suffers from the disadvantage, that it is necessary to calibrate the applied D. C. and pulse currents in order to fix the position of the B axis. Also, it is necessary to place at least three wires through the magnetic core under test. This latter is difficult with magnetic cores which are extremely small. Figure 4 shows a scheme which requires only two coils 50, 52 to pass through the core in order to achieve identical results. In Fig. 4 apparatus performing the same functions as in Figure 1 have the same identifying reference numerals applied thereto. It will be seen that the direct current bias source 18 is coupled to a first coil 50 through a resistor 54 having a substantially high resistance value. This is necessary in order that there be isolation between the direct current bias source and the pulse source 22. An inductance may be substituted for the resistor 54 for blocking the pulses out of the direct current source if desired. A current measuring resistor 24 is connected in series with the first coil, 50, and the signal to the horizontal deflectors of the cathode ray tube is obtained from across this measuring resistor as before. A second or output coil 52 is coupled to an integration network 36, as previously, which in turn has its output applied to the vertical deflectors of the cathode ray tube 28.

The operation of this system is the same as previously. The direct current power unit provides a steady current bias which maintains the core under test in one of its states of magnetic saturation. The pulse supply, as previously, provides pulses of progessively larger amplitude to drive the core from one to its other state of magnetic saturation.

The fact that each pulse drives the core from the same starting position, namely, its biased position at A on the hysteresis curve shown in Fig. 2, insures that a maximum flux change is caused by each one of the driving pulses and accordingly the voltage induced in the second coil is a maximum. With this circuit the cathode ray beam is deflected proportional to H and not proportional to the change of H alone as before, since the current measured across the measuring resistor is the algebraic sum of the current provided by the direct current power unit and the pulser. If the cathode ray beam is located on the B axis with steady state current flowing, the curve obtained will be correctly spaced about the B axis. It is still necessary to calibrate, as before, however, to obtain the location of the H axis.

To modify the system shown in Fig. 4 for operation with a single coil which can consist of a single wire, reference is made to the schematic diagram shown in Fig. 5. Here, again, similar functioning apparatus with that of Figures 1 and 4 is provided with the same reference numerals. A single coil 60 which may consist of a single turn is passed through the toroidal core. The direct current power supply is coupled to this core through an isolating resistor R. The pulse power supply is also coupled to the single coil as before. The voltage induced in this single coil, as a result of the toroidal core being driven, is detected across the single coil, and accordingly the integrating network is connected thereacross. A common ground return 62 is used for both the direct current bias supply and the pulse source. The measuring resistor 24 is inserted in this common ground return 62. The algebraic sum of the currents may be measured by connecting across this resistor as previously.

This system permits a rapid, mass production method of testing magnetic cores to obtain a hysteresis characteristic, since a single turn is all that is required to pass through a toroid.

The driving pulse from the pulse source is not integrated by the integrating network since the impedance of the single through coil is so low that substantially no voltage exists across it during the existence of the pulse, only current. However, when the core turns over there is a voltage induced in the coil and it acts like a low impedance voltage source providing a voltage which may be integrated.

The pulse source may be any source of a desired number of pulses of successively increasing amplitude. This may be, for example, a multivibrator or blocking oscillator or other continuous source of pulses which are shaped to be rectangular and then applied to an amplifier whose gain can be controlled by a low frequency sine wave or sawtooth. A suitable amplifier is described and claimed in an application by R. Stuart Williams, filed March 31, 1953, Serial No. 345,824, entitled "Amplifying Device," and assigned to this assignee.

There has been described and shown above a simple, novel system for obtaining the hysteresis characteristic of magnetic materials. This system is especially effective in the situation where the hysteresis characteristic of small toroidal cores is required, whose diameter is on the order of .0015 centimeter.

What is claimed is:

1. Apparatus for obtaining the hysteresis characteristics of magnetic material comprising means to apply a magnetomotive force to said magnetic material to position it in one of its magnetically saturated regions, means to apply pulses of magnetomotive force to said magnetic material in successive increasing amplitude steps in a direction to drive said magnetic material toward the other of its magnetically saturated regions, means to detect the changes in flux in said material due to the operation of said means to apply pulses of magnetomotive force, and means to display the output from said means to detect flux changes and said means to apply pulses of magnetomotive force.

2. Apparatus for obtaining the hysteresis characteristics of magnetic material comprising a first, a second and a third coil inductively coupled to said magnetic material, means to apply a direct current to said first coil having an amplitude sufficient to bias said magnetic material to one of its magnetically saturated regions, means to apply current pulses to said second coil in successive increasing amplitude steps in a direction to drive said magnetic material toward the other of its magnetically saturated regions, integrating means coupled to said third coil, means to measure the current through said second coil, and means to display the output from said integrating means and said means to measure current.

3. Apparatus for obtaining the hysteresis characteristic of magnetic material comprising a first coil and a second coil inductively coupled to said magnetic material, means to apply a direct current to said first coil having an amplitude sufficient to bias said magnetic material to one of its magnetically saturated regions, means to apply current pulses to said second coil in successive increasing amplitude steps in a direction to drive said magnetic material toward the other of its magnetically saturated regions, an isolating impedance coupled between said means to apply a direct current and said means to apply current pulses, means to measure the current through said first coil, integrating means coupled to said second coil and means to display the output from said integrating means and said means to measure current.

4. Apparatus for obtaining the hysteresis characteristics of magnetic material comprising a coil inductively coupled to said magnetic material, means to apply a direct current to said coil having an amplitude sufficient to bias said magnetic material to one of its magnetically saturated regions, means to apply current pulses to said second coil in successive increasing amplitude steps in a direction to drive said magnetic material toward the other of its magnetically saturated regions, an isolating impedance coupled between said means to apply a direct current and said means to apply current pulses, a common return path from said coil to said means to apply a direct current and said means to apply current pulses, a measuring impedance connected into said common return path, means to measure the voltage across said measuring impedance, means to integrate the voltage induced in said coil and means to display the output of said measuring means and said means to integrate.

5. A method for obtaining the hysteresis characteristics of magnetic material comprising the steps of successively applying increasing larger amplitude pulses of magnetomotive force to said magnetic material in a direction to drive said magnetic material from one toward the other of its magnetically saturated regions, restoring said magnetic material to its one saturated region between the application of each of said increasing larger pulses of magnetomotive force, detecting the successive flux changes in said magnetic material and displaying an indication of said detected flux changes.

6. A method for obtaining the hysteresis characteristics of magnetic material comprising the steps of applying a magnetic bias to said magnetic core to position it in one of its magnetically saturated regions, successively applying increasingly larger amplitude pulses of magnetomotive force to said magnetic material in a direction to drive said magnetic material toward the other of its magnetically saturated regions, detecting the successive flux changes in said magnetic material due to said successively applied magnetomotive force, and deflecting an indicator in one direction responsive to the amplitude of said detected flux changes and at right angles to said one direction responsive to the amplitude of said successively applied pulses of magnetomotive force.

7. In a method for obtaining the hysteresis characteristics of magnetic material, the combination of the steps of successively applying increasing larger amplitude pulses of magnetomotive force to said magnetic material in a direction to drive said magnetic material from one toward the other of its magnetically saturated regions, and restoring said magnetic material to its one saturated region between the application of each of said increasing larger pulses of magnetomotive force.

8. In a method of obtaining the hysteresis characteristics of magnetic material, the combination comprising successive pairs of steps, each pair including as one step of the pair applying a first pulse of magnetomotive force to said material in one sense, and as the second step of the pair applying a magnetomotive force in a sense opposite said one sense of sufficient amplitude to saturate magnetically said material, said first pulse being of greater amplitude at each repetition than the first pulse of the preceding pair of steps.

9. In a method as claimed in claim 8, the combination comprising the further step of detecting the successive flux changes in said magnetic material by integrating the voltage induced by said flux change in an output coil.

10. In a method of obtaining the hysteresis characteristics of magnetic material comprising successive pairs of steps, each pair including as one step of the pair applying a first pulse of magnetomotive force to said material in one sense, and as the second step of the pair applying a magnetomotive force in a sense opposite said one sense of sufficient amplitude to saturate magnetically said material, said first pulse being of greater amplitude at each repetition than the first pulse of the preceding pair of steps, and the further steps of detecting the successive flux changes in said magnetic material by integrating the voltage induced by said flux change in an output coil and displaying an indication of said integrated voltage thereby to display an indication of said detected flux changes.

References Cited in the file of this patent

UNITED STATES PATENTS

| | | |
|---|---|---|
| 1,574,350 | Johnson | Feb. 23, 1926 |
| 2,150,386 | Manley | Mar. 14, 1939 |
| 2,415,789 | Farrow | Feb. 11, 1947 |